United States Patent Office 2,803,508
Patented Aug. 20, 1957

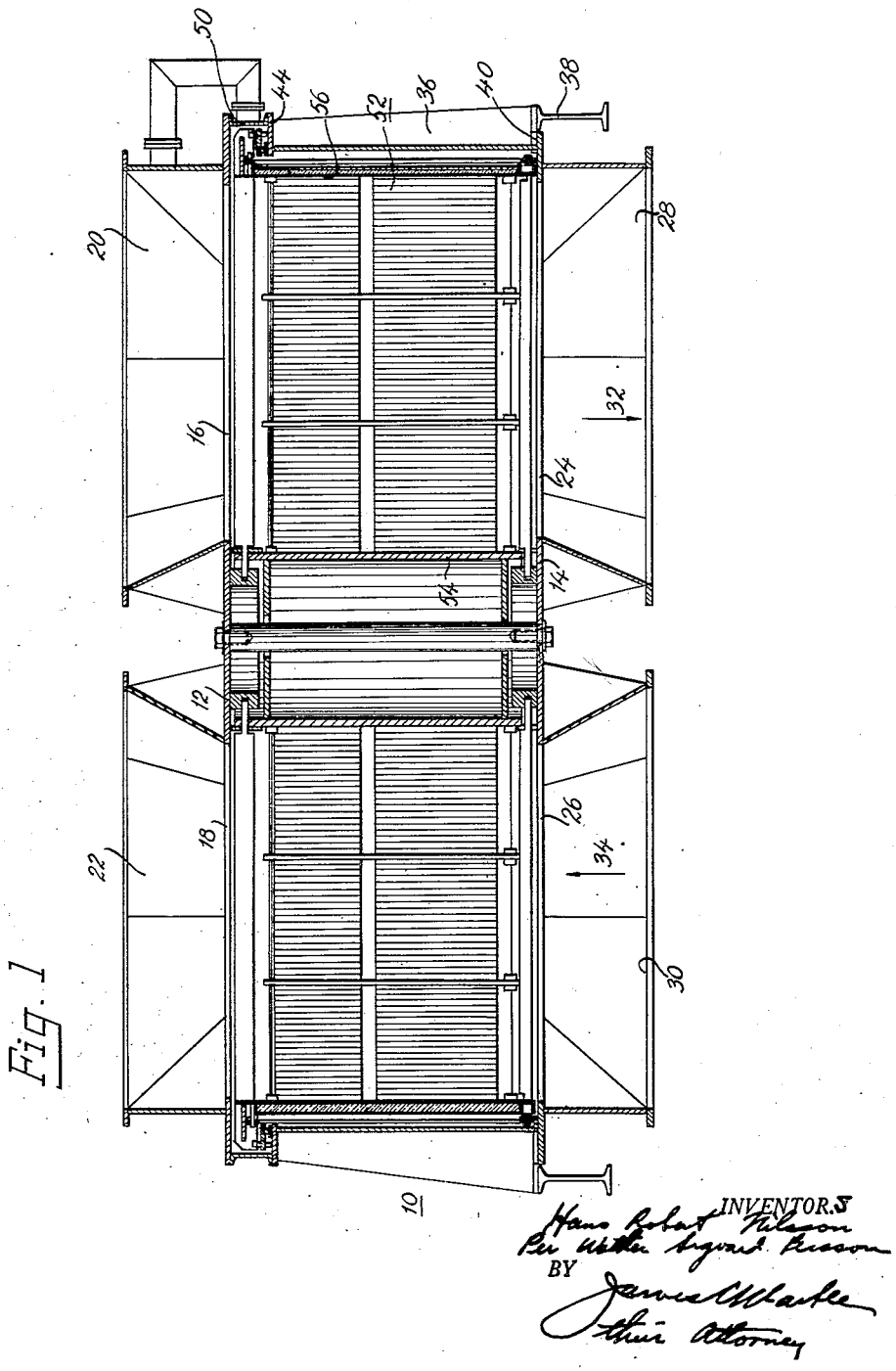

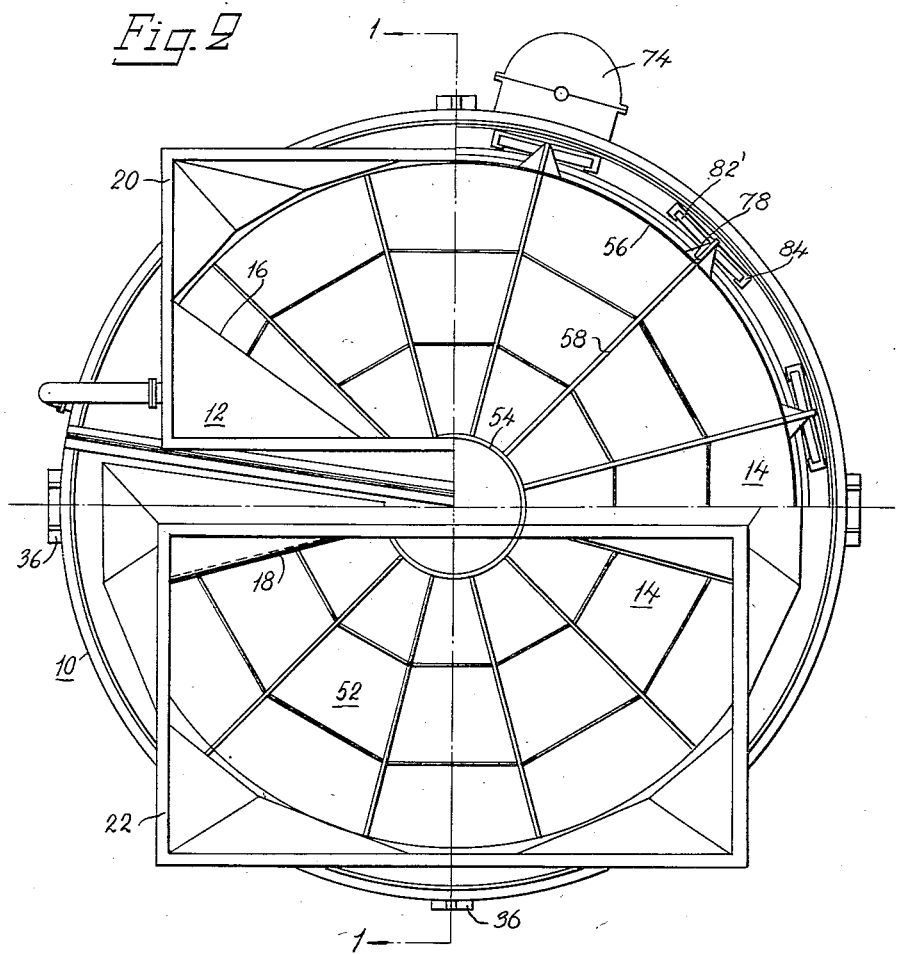

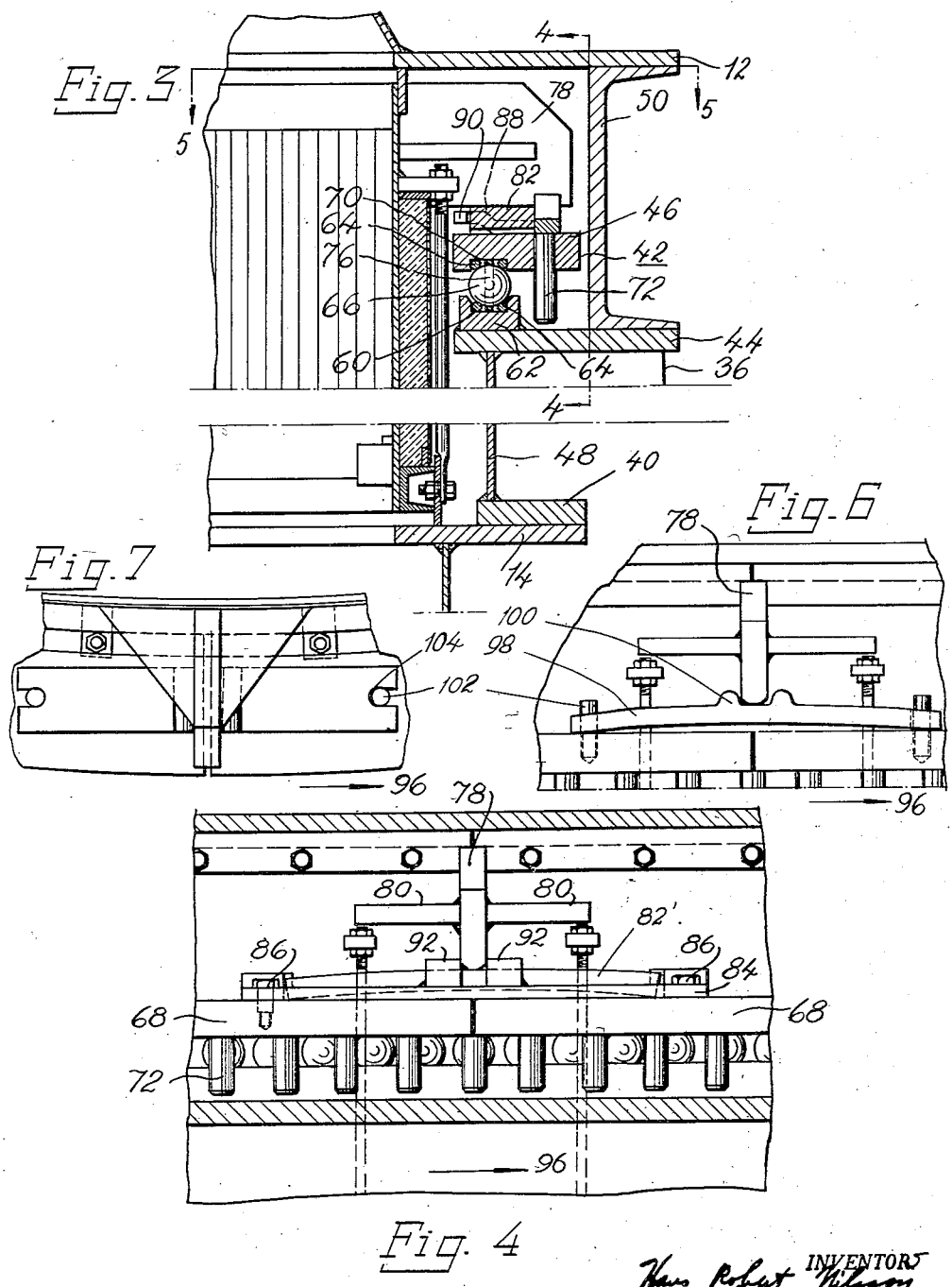

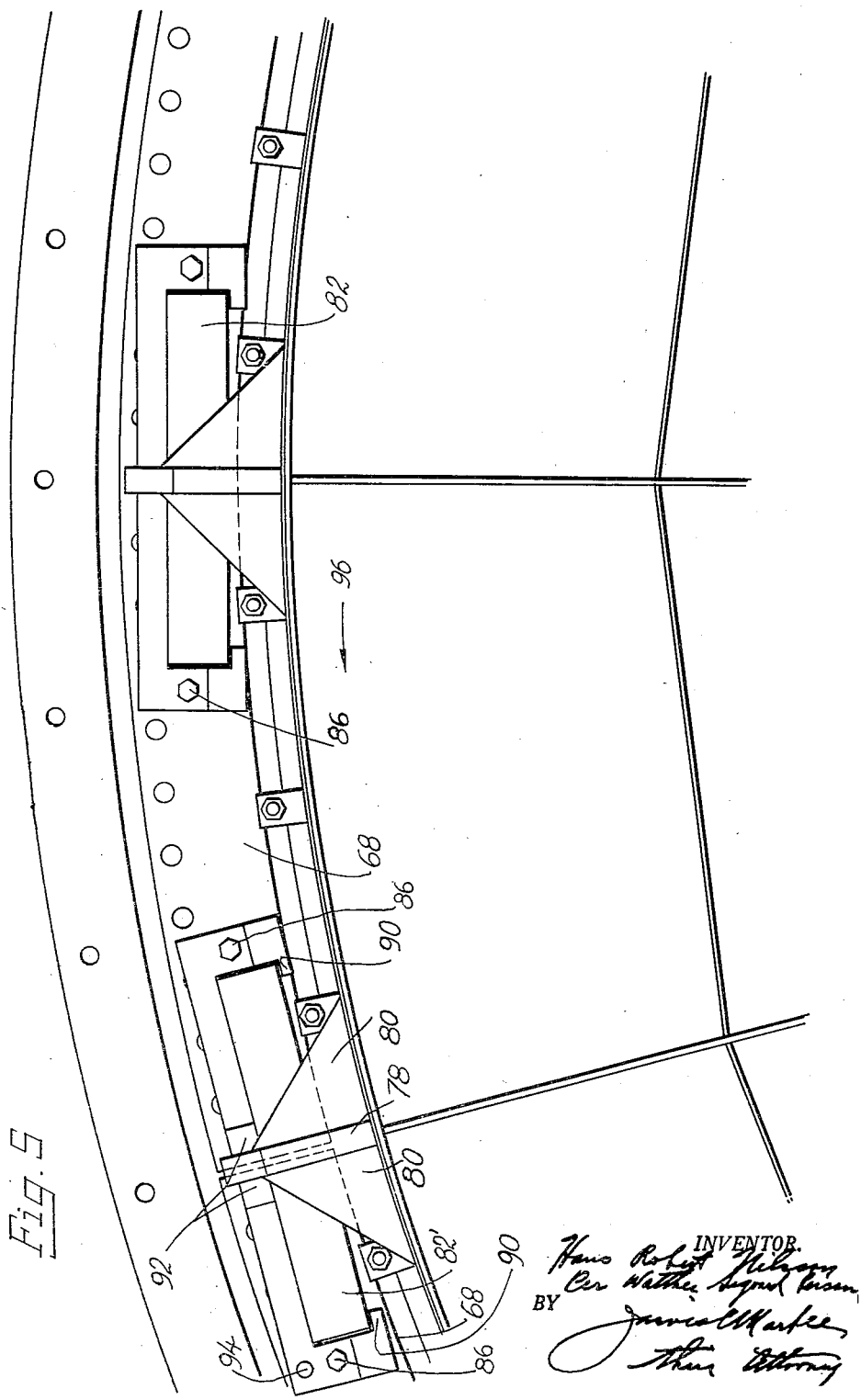

2,803,508

ROTARY DEVICES, PARTICULARLY ROTARY HEAT EXCHANGERS

Hans Robert Nilsson, Ektorp, and Per Walther Sigvard Persson, Johanneshov, Sweden, assignors to Svenska Rotor Maskiner Aktiebolag, Nacka, Sweden, a corporation of Sweden Application March 14, 1955, Serial No. 494,007

23 Claims. (Cl. 308—219)

The present invention relates to rotary devices and more particularly to a rotary structure adapted for antifriction mounting at its periphery.

The general object of the invention is to provide an attachment for revolving rotor equipment which will provide the equipment with a ball bearing assembly on which the rotor is carried by its own weight and on which the same can be operated and wherein one of the races includes a pin rack or similar means while the other race serves as a support for connecting the assembly to a fixed member and wherein access can be readily had to the interior of the race members for the removal or changing of the ball bearings.

Other objects of the present invention are to provide a ball bearing assembly on which the rotor weight is carried by means of peripherally spaced carrying means extending radially from the rotor, means further being provided to distribute the rotor weight to as many balls as possible around each place of contact between each rotor carrier and the race upon which the latter rests and to increase the places of contact of the forces from the rotor weight along the circumference of the ball bearing assembly. Still other objects are to provide for self centering of the rotor upon the ball bearing assembly and to provide means for fixing the rotor and the rotatable bearing race peripherally in relation to each other and to provide for relative radial movements between the rotor component and the respective races of the ball bearing assembly, coaxial relationship between the races and the rotor and full registering between both the races still being maintained. Another object is to provide an attachment for a revolving rotor equipment which is inexpensive to manufacture, easy to install and remove, and efficient in operation.

The invention is particularly adapted for heat exchange apparatus of the rotary type in which heat exchange between two gaseous fluids is carried out for purposes such as the preheating of air to be used for combustion, by waste heat extracted from combustion gases exhausted from apparatus such as power boilers. The invention will therefore be described hereinafter, by way of example but without limitation, as applied to air preheating structure, but it will be understood that the principles of the invention are capable of being used in many other applications and that, for certain of such applications, the principles of the invention in its broader aspects may be carried out with only certain features of the structure hereinafter described in connection with the air preheater apparatus chosen by way of example.

Past development of air preheaters of the kind in which a rotor filled with metallic regenerative material is turned so that the material passes alternatively through a stream of hot gas from which it absorbs heat and a stream of cold gas to which the absorbed heat is rejected has led to the use of larger and larger units, rotors of upwards of twenty feet diameter and twenty-five tons weight being relatively common. Also, in order to secure most effective heat transfer it is universal practice to conduct the gas and air streams through the rotor in counter current relation so that the cold air enters the same end of the rotor from which the cooled gas is discharged and after being heated leaves the other end of the rotor which receives the hot gases. This results, in service, of a hot end and a cold end of the rotor, between which there is a substantial temperature difference and as a consequence there is a resultant distortion of the rotor, with the outer cylindrical shell tending to become conical and the entire rotor tending to "dish" with reference to a plane normal to the axis of rotation. In large modern preheaters, the dimensional magnitude of such distortion may be considerable.

In order to prevent short circuiting of the rotor by the heat exchanging fluids and leakage of one into the duct for the other, seals are required between the ends of the rotor and the end plates of the stationary housing structure encasing the rotor. Rotor distortion of the kind discussed above makes the problem of providing effective seals extremely difficult particularly since the development of the art has led to the substantially universal practice of mounting the rotor, by means of a center post or the like, at the axis of rotation. With a center mounting for the rotor, maximum change of clearance between the rotor and the casing occurs at the periphery of the rotor, where circumferential seals are required at each end of the rotor and where, in addition, radial seals extending from the center of the rotor must be provided. In order to take care of the very material variations in clearance that occur, a great many different kinds of sealing means have been proposed, but none have proved to be entirely satisfactory, either because of failing to provide a sufficiently effective seal, too great complexity and weight, too great frictional resistance, unduly rapid wear, prohibitive cost or combinations of such deficiencies.

In order to secure minimum variation in the clearances between the rotor and the casing at the periphery of the rotor early constructions provided for the support of the rotor by means of roller supports engaging an external peripheral flange on the rotor. Because of the nature of the apparatus, only three such supports could in practice be effectively used, with resultant wear at such rapid rate as rotors became larger and heavier that the construction had to be abandoned in favour of center post mounting, even though the latter increased the difficulties of the sealing problem and increased the weight and cost of the apparatus because of the necessity for the provision of heavy cross beams to carry the centrally located bearings and the weight of the rotor. Since in the majority of installations preheaters are mounted in lofty positions, as above large power boilers, overall weight is a highly important factor because of its influence on the cost of the supporting structure.

With the foregoing deficiencies of present constructions in mind it is therefore an additional object of the present invention to provide a new and improved preheater construction which for a given size and capacity is materially lighter and less expensive than the presently best available constructions, which provides improved sealing with simple and inexpensive sealing means, and which provides further advantages the nature and details of which will appear more fully as this specification proceeds.

For a better understanding of the more detailed nature of the invention, the manner in which it may be carried out and the advantages to be derived from its use into practical effect, reference may best be had to the ensuing portion of this specification, taken in conjunction with the accompanying drawings illustrative by way of example but without limitation of different examples of constructions embodying the principles of the invention.

In the drawings:

Fig. 1 is a vertical central section, taken on line 1—1 of Fig. 2, of a rotary regenerative heat exchanger embodying the principles of the invention.

Fig. 2 is a top plan view, partly in section of the heat exchanger shown in Fig. 1.

Fig. 3 is a fragmentary broken vertical section on enlarged scale of a part of the structure shown in Figs. 1 and 2.

Fig. 4 is a fragmentary section taken on the line 4—4 of Fig. 3.

Fig. 5 is a fragmentary section taken on the line 5—5 of Fig. 3.

Fig. 6 is a fragmentary section similar to Fig. 4 and showing another form of rotor supporting construction.

Fig. 7 is a fragmentary section similar to Fig. 5 of the construction shown in Fig. 6.

Referring now more particularly to Fig. 1 and related figures of the drawings, there is illustrated one suitable form of preheater for carrying the invention into effect. The apparatus shown comprises a stationary outer casing structure, indicated generally at 10, having spaced end plates 12 and 14 between which the rotor is mounted. Plate 12 is provided with two sector shaped openings or ports 16 and 18 located generally on opposite sides of a diametral plane through the rotor. These ports are connected respectively with ducts 20 and 22 for conducting one of the heat exchanging fluids to the rotor and the other fluid from the rotor. Plate 14 is likewise provided with sector shaped ports 24 and 26, aligned respectively with ports 16 and 18 in plate 12 and communicating respectively with ducts 28 and 30 for conducting the first mentioned fluid from the rotor and said other fluid to the rotor. Countercurrent flow of the two fluids provides for most efficient heat transfer and in accordance with that practice the apparatus illustrated is advantageously connected so that for example cold air to be heated is admitted through duct 20 and port 16 to the top of the rotor and after being heated is discharged therefrom through port 24 and duct 28, as indicated by arrow 32, while hot gas to be cooled enters through duct 30 and port 26 to flow upwardly through the rotor and be discharged in the direction of arrow 34 through port 18 and duct 22. With such connections it will be evident that the upper end of the aparatus will be cooler than the lower end when in use and for convenience the end of the apparatus to which fluid to be heated is admitted and from which cooled fluid is discharged will be referred to as the "cold" end, the opposite end being referred to as the "hot" end. It will be obvious that either the upper end or the lower end may be the cold end, so long as counter current flow relation is maintained depending upon which ducts are connected to the sources of supply of the different fluids.

The rotor is circumferentially enclosed and supported by portions of the stationary structure extending between the end plates, which structure in the present example includes a number of peripherally spaced standards 36 adapted to rest on suitable supporting beams 38 and connecting in rigidly spaced relation a lower ring 40 to which end plate 14 is secured and an upper ring member 44, which constitutes the lower bearing member of a bearing indicated generally at 42 and having an upper bearing member indicated generally at 46 carrying the rotor. The nature of bearing 42 will later be described more in detail.

The space between parts 40 and 44 is closed by a cylindrical shell 48 which advantageously is of relatively thin section because of weight considerations the weight of the rotor being carried primarily by the standards 36.

Member 44 supports a ring 50 of channel section which in turn supports the upper end plate 12. For reasons hereinafter appearing, ring 50 is advantageously formed by a plurality of segmental elements secured to the structure by bolts, studs or the like separately removable.

From the foregoing it will be apparent that the shell 48, member 44 and ring 50 provide a circumferential casing structure encircling the rotor, and that this structure together with the end plates provides a stationary structure encasing the rotor and providing means for supporting it. This stationary structure provides one of the two principal components of the apparatus.

The other principal component is the rotor, indicated generally at 52, which in the present embodiment is formed by two concentric shells 54 and 56 connected by a plurality of radial partitions 58 dividing the annular space between the shells into a number of sectors which may be further subdivided by webs into a larger number of compartments adapted to be filled with regenerative heat exchanging material (not shown) in accordance with well known practice.

In accordance with a basic feature of the present invention the rotor is rotatably supported at this periphery by the bearing 42, rather than at or adjacent to its center on axis of rotation, the many advantages of peripheral support hereinafter to be pointed out being secured by the provision of bearing construction the nature and functioning of which enables the practical and economical application of peripheral support to be obtained inexpensively and with not only a long life factor but also relative ease of repair and replacement when wear does occur.

The lower bearing member 44 is provided with a load-carrying raceway 60 in the form of an annular recess which may be cut directly in said bearing member itself but in the construction shown on the lower bearing member 44 is fastened a ring 62 made up of a number of segments each providing a segmental section of the annular recess 60 in the corners of which are located arcuate lengths of wire 64 providing lower rails upon which a multiplicity of balls 66 may roll.

The number of lengths or sections of wire in each circumference may vary and if desired each rail may consist of only one piece. The joints between adjacent ends of wire should however be staggered.

The upper bearing member 46 may comprise a rigid ring but in the construction shown the same is comprised of a plurality of arcuate elements 68 each providing a segmental section of an annular recess 70 forming the upper raceway for the balls 66 registering with the lower raceway 60. The arcuate elements 68 carry pins 72 which form the teeth of a peripheral rack with which the driving gear 74 for turning the rotor meshes. Additional arcuate lengths of wire 64 in the corners of recess 70 provide upper rails engaged in rolling contact by balls 66, the latter being held in evenly spaced relation peripherally by the retainer 76 which is also advantageously in the form of a series of separate segmental elements.

As in the case of the lower rails, the joints in the upper rails should be staggered both with respect to each other but also with respect to the joints in the lower rails, so that no ball passes over more than one joint at a time.

To the upper end of the outer rotor shell 56 is welded a plurality of radially extending vertical brackets or lugs 78, each one opposite a radial partition wall 58 of the rotor and each one reinforced by means of horizontal brackets 80 welded to the rotor shell 56 and the lugs 78. By means of said lugs 78 resting directly on the upper rotatable bearing member 46 the rotor 52 may be carried by means of said rotatable bearing member and as the weight of the rotor 52 may be considerable in several cases no further means are necessary to attach the rotor to the rotatable bearing member 46, the rotor simply rotating with the rotatable bearing member at the turning of the latter on account of the frictional engagement between the carrying lugs 78 and the rotatable bearing member 46.

In the present embodiment the rotor during the operation becomes hot and expands radially relative to the housing. The brackets or lugs 78 carrying the rotor are free to slide radially upon the upper rotatable bearing member 46 but particularly in rotor constructions of very large diameter due to heat conducted to the upper bearing member at the same time will increase materially in width so that the exact registering between the races in the upper and the lower bearing members will be adversely affected. In order to avoid the differential expansion between the upper and lower bearing members due to temperature difference it is advisable, as stated above, to make the rotatable bearing member of relatively movable segments 68 permitting radial enlargement and contraction of the rotatable bearing member while still retaining the coaxial alignment of the bearing tracks.

The plurality of ring segments 68 are independently movable in radial direction relative to the rotor brackets or lugs 78 and individually guided thereto in a manner which will be described below. Generally at least one carrying bracket 78 is brought to register with each ring segment 68, the latter being brought to fix peripherally in relation to the rotor and said mutually fixed peripheral relationship is effected by means of the carrying brackets or lugs 78.

However, as it is not possible in practice to manufacture the preheater with sufficient precision to bring all the carrying lugs to make contact with the rotatable bearing member 46, in the construction shown resilient means in the form of arcuately upwardly bent plate springs 82 are provided between each bracket or lug 78 and the bearing ring 46. Such a plate spring is designed for instance so that the same permits resilient replacement from 1 to 2 mm. Besides the advantage of a more even force distribution on the bearing ring 46 these resilient means 82 resting at both their ends on the bearing ring 46 provides twice as many contacts of force upon the bearing ring 46. The bearing ring which may be made in for instance six or more segmental sections depending upon the size of the preheater for reasons of costs only can be made of limited thickness wherefore the weight of the rotor is distributed only upon a relatively small number of balls 70 along the extension of the bearing ring reckoned from the place of force contact. An increase in the number of force contact points results in a greater number of balls carrying the weight of the rotor.

The general arrangement of the brackets or lugs 78 and the segmental sections 68 is preferably such that a symmetrical distribution of the parts is obtained and the load is also evenly distributed. The resilient means can be utilized to bridge the joints between the segmental sections 68 of the upper bearing ring 46 as for instance the plate spring 82' in Figs. 4 and 5. With only the plate springs located in this way as bridging means between the ends of the segmental sections 68, the weight of the rotor is transferred to each segmental section via the brackets or lugs 78 in two places, viz. at the ends thereof.

The arched plate springs 82, 82' at the apex thereof engage the rotor brackets or lugs 78 and in order to maintain the registering between said parts each plate spring is framed by a U-shaped frame member 84 which encloses the plate spring along one longitudinal side and both ends thereof so that the plate spring is maintained in its position but free to expand in the frame. Said frame member is secured to the segmental ring section 68 or pair of sections by means of screws 86 or similar means. The free ends 88 of the frame member 84 are provided with inwardly directed projections 90 facing the opposite longitudinal side of the plate springs and in order to facilitate the mounting and removal of the frame member its free ends are bent slightly upward. The frame is further provided with guide means in the form of projections 92 registering with the corresponding rotor brackets or lugs 78 and said guide means serve on the one hand as driver for the rotatable bearing member and on the other hand as means to center the rotor at the radial expansion thereof due to heating. Owing to its design the frame is easily removable and for such purpose a segmental element of the ring 50 is removed, whereafter the frame is tilted and then lifted up over the plate spring for dismantling of a bearing section. When the frame is removed the plate spring 82 can be drawn out by means of a suitable tool and a segmental section 68 of the upper bearing ring 46 may then be removed without lifting of the rotor. After mounting of the segmental section of the upper bearing ring the plate spring is forced into position and the frame is fastened to the segmental section.

As shown in Fig. 5 only the plate springs 82' bridging the joints between the segmental sections 68 of the upper bearing ring 46 are provided with guide means for the rotor brackets or lugs while such means are omitted for the plate springs 82 positioned between the ends of the segmental sections. It is sufficient if each segmental section is fixed in peripheral relation to the rotor at one point of the segmental section. One of the frames on each segmental section is maintained in fixed position to the segmental section by means of a dowel pin 94. It is the frame members 82' bridging the joints between the segmental sections which include a dowel pin to secure the leading edge of the bridging frame member to the trailing end of the leading segmental section as viewed in the direction of rotation indicated by arrow 96.

The structure just described provides numerous important advantages with respect to both initial cost and upkeep. As to the former, the use of the wire elements 64 to provide the tracks for the balls eliminates the need for providing finely finished surfaces forming the recesses 69 and 70. The wire elements themselves are very inexpensive advantageously being made of piano wire or other high carbon or steel like metal of similar elastic nature. Balls 66 are advantageously of the kind used in standard ball bearings and also may be relatively inexpensive since the action of the bearing is such that a high degree of precision in the parts is not required and balls rejected for use in ordinary ball bearings because of failure to meet dimensional tolerances may readily be used. The reason for this is that the number of balls employed in relation to the weight carried is such that the balls deform the wire rails sufficiently to create narrow tracks on the rails, and the elasticity of the metal of the rails and of the balls themselves is sufficient to compensate for minor dimensional variations. The elastic deformation that is possible with the construction described also insures even distribution of the weight carried by the bearing. Such construction is made practically possible because of the fact that in apparatus of the kind under consideration the speed of rotation of the rotors is only a very few revolutions per minute, so that even in the case of relatively very large diameter rotors the linear speed of operation of the bearing is very low as compared with usual anti-friction bearing applications. Wear is thus very slow particularly since temperature conditions may be controlled so that the bearing may readily be grease lubricated. Because of the anti-friction nature of the bearing, power consumption is very low.

By virtue of the manner in which the tracks or rails are formed on the rails by the action of the bearing itself, sections or segments of the rails and also individual balls that become unduly worn or otherwise defective can readily be replaced and this is easily accomplished because of the removably segmental construction of the parts 50 and 68, giving access from the exterior of the casing to the balls and rails. In the construction shown, balls and rail segments can be removed while the bearing is under load.

It will be evident that the bearing construction is such that not only is the bearing member 44 fixed both radially and axially with respect to the end plate 12, but also the upper bearing member 46 which is radially fixed by the balls 66. The rack 72 is thus fixed with respect to the stationary structure carrying the driving gear 74 which enables simple and inexpensive forms of gearing to be used and also makes the apparatus adaptable for friction drive.

The fixed position of the bearing member 46 axially relative to the end plate 12 is highly important from the standpoint of effective sealing, since it maintains the end of the outer rotor shell located in substantially fixed relationship axially with respect to the adjacent end plate, regardless of dishing or other distortion of the rotor caused by temperature differentials. As the sealing means form no part of this invention reference may be had to our copending patent application Ser. No. 349,344 for the arrangement of appropriate seals and the details of construction thereof.

In Figs. 6 and 7 the resilient support construction is modified in such a manner that the plate spring 98 is provided with guide means in the form of projections 100 thereon for registering with the rotor carrying brackets or lugs 78. The plate springs are fixed in peripheral direction relative to the bearing ring segmental sections 68 by means of stop pins 102 fastened to the segmental sections and keying with recesses 104 at the ends of the plate spring.

From the foregoing it will be obvious that the principles of the invention may be carried into effect by means of a wide variety of specific structural embodiments, that various features may be combined in different ways and that certain features may be employed to the exclusion of others. The invention is accordingly to be understood as embracing all forms of apparatus falling within the scope of the appended claims.

What we claim is:

1. A rotary device comprising a rotor component having a closed outer circumferential shell and a plurality of bracket means extending radially outwardly from said shell; a ball bearing construction including a lower stationary supporting member having a raceway on the upper side thereof coaxial with the rotor component, an upper rotatable member having a raceway on the under side thereof adapted to register with the raceway in the stationary member, anti-friction bearing elements in said raceways for maintaining the members in axially spaced relation; the bracket means being supported at peripherally spaced places by the rotatable bearing member in order to sustain the weight of the rotor component by the plurality of bracket means supported on the rotatable bearing member.

2. A rotary device as claimed in claim 1, in which the rotatable bearing member comprises a plurality of peripherally spaced segmental sections, each segmental section supporting at least one of the bracket means for carrying the rotor component.

3. A rotary device as claimed in claim 2, in which means are provided to fix each segmental section of the rotatable bearing member peripherally in relation to the rotor component.

4. A rotary device as claimed in claim 3, in which each segmental section of the rotatable bearing member is provided with means to fix the segmental section peripherally in relation to at least one of the bracket means carrying the rotor component.

5. A rotary device comprising a rotor component having a plurality of radially extending bracket means; a ball bearing construction including a lower stationary supporting member having a raceway on the upper side thereof coaxial with the rotor component, an upper rotatable member having a raceway on the under side thereof adapted to register with the raceway in the stationary member, anti-friction bearing elements in said raceways for maintaining the members in axially spaced relation; and a plurality of peripherally spaced resilient supporting means resting on the rotatable bearing member, each of said resilient supporting means being adapted to register with one of the bracket means extending radially from the rotor component in order to sustain the weight of the rotor component by the plurality of the bracket means resiliently supported on the rotatable bearing member.

6. A rotary device comprising a rotor component having a plurality of radially extending bracket means; a ball bearing construction including a lower stationary supporting member having a raceway on the upper side thereof coaxial with the rotor component, an upper rotatable member having a raceway on the under side thereof adapted to register with the raceway in the stationary member, anti-friction bearing elements in said raceways for maintaining the members in axially spaced relation; and a plurality of peripherally spaced arched plate springs resting with downwardly directed ends thereof on the rotatable bearing member, each of said arched plate springs being adapted to register at the apex thereof with one of the bracket means extending radially from the rotor component.

7. A rotary device comprising a rotor component having a plurality of radially extending bracket means; a ball bearing construction including a lower stationary supported member having a raceway on the upper side thereof coaxial with the rotor component, an upper rotatable member having a raceway on the under side thereof adapted to register with the raceway in the stationary member, anti-friction bearing elements in said raceways for maintaining the members in axially spaced relation; a plurality of peripherally spaced arched plate springs resting with downwardly directed ends thereof on the rotatable bearing member, and guide means adapted to bring each of said arched spring plates to register at the apex thereof with one of the bracket means extending radially from the rotor component.

8. A rotary device as claimed in claim 7, in which the guide means comprise key means protruding from the rotatable bearing member into locking spaces provided in the arched plate springs.

9. A rotary device comprising a rotor component having a plurality of radially extending bracket means; a ball bearing construction including a lower stationary supporting member having a raceway on the upper side thereof coaxial with the rotor component, an upper rotatable member having a raceway on the under side thereof adapted to register with the raceway in the stationary member, anti-friction bearing elements in said raceways for maintaining the members in axially spaced relation; and a plurality of peripherally spaced arched plate springs resting with downwardly directed ends thereof on the rotatable bearing member, a substantially U-shaped frame member attached to the rotatable bearing member and framing each arched plate spring along one longitudinal side and both ends thereof, said frame member including means to bring each arched plate spring to register at the apex thereof with one of the bracket means extending radially from the rotor component.

10. A rotary device as claimed in claim 9, in which the free ends of the frame members have inwardly directed projections facing the opposite longitudinal side of respective plate spring.

11. A rotary device as claimed in claim 10, in which the free ends of the frame members are bent upward.

12. A rotary device as claimed in claim 9, in which the longitudinal section of the frame member is provided with guide projections registering with the corresponding bracket means extending from the rotor component.

13. A rotary device comprising a rotor component having a plurality of radially extending bracket means; a ball bearing construction including a lower stationary supporting member having a raceway on the upper side thereof coaxial with the rotor component, an upper rotatable member comprising a plurality of peripherally spaced segmental sections and having a raceway on the under side thereof adapted to register with the raceway in the stationary member, anti-friction bearing elements in said raceways for maintaining the members in axially spaced relation; and a plurality of peripherally spaced resilient supporting means resting on the rotatable bearing member, each of said resilient supporting means being adapted to register with one of the bracket means extending radially from the rotor component in order to sustain the weight of the rotor component by the plurality of the bracket means resiliently supported on the rotatable bearing member.

14. A rotary device comprising a rotor component having a plurality of radially extending bracket means, a ball bearing construction including a lower stationary supporting member having a raceway on the upper side thereof coaxial with the rotor component, an upper rotatable member comprising a plurality of peripherally spaced segmental sections and having raceway on the under side thereof adapted to register with the raceway in the stationary member, anti-friction bearing elements in said raceways for maintaining the members in axially spaced relation; a plurality of peripherally spaced resilient supporting means resting on the rotatable bearing member, each of said resilient supporting means being adapted to register with one of the bracket means extending radially from the rotor component in order to sustain the weight of the rotor component by the plurality of the bracket means resiliently supported on the rotatable bearing member; and means provided on the segmental sections of the rotatable bearing member to fix the position of the resilient supporting means thereon in order to maintain said segmental sections in their peripherally spaced relationship.

15. A rotary device comprising a rotor component having a plurality of radially extending bracket means; a ball bearing construction including a lower stationary supporting member having a raceway on the upper side thereof coaxial with the rotor component, an upper rotatable member comprising a plurality of peripherally spaced segmental sections each of which is associated with at least one bracket means of the rotor, said upper rotatable member having a raceway on the under side thereof adapted to register with the raceway in the stationary member, anti-friction bearing elements in said raceways for maintaining the members in axially spaced relation; and a plurality of resilient supporting means resting on the rotatable bearing member and distributed in peripherally spaced relationship in such a way that each of the segmental sections of the rotatable member carries at least one of the resilient supporting means, each of said resilient supporting means being adapted to register with one of the bracket means extending radially from the rotor component in order to sustain the weight of the rotor component by the plurality of the bracket means resiliently supported on the segmental sections of the rotatable bearing member.

16. A rotary device comprising a rotor component having a plurality of radially extending bracket means, a ball bearing construction including a lower stationary supporting member having a raceway on the upper side thereof coaxial with the rotor component, an upper rotatable member comprising a plurality of peripherally spaced segmental sections each of which is associated with at least one bracket means of the rotor, said upper rotatable member having a raceway on the under side thereof adapted to register with the raceway in the stationary member, anti-friction bearing elements in said raceways for maintaining the members in axially spaced relation; a plurality of resilient supporting means resting on the rotatable bearing member and distributed in peripherally spaced relationship in such a way that each of the segmental sections of the rotatable member carries at least one of the resilient supporting means, each of said resilient supporting means being adapted to register with one of the bracket means extending radially from the rotor component in order to sustain the weight of the rotor component by the plurality of the bracket means resiliently supported on the segmental sections of the rotatable bearing member; and means provided on the segmental sections of the rotatable bearing member to fix the position of the resilient supporting means thereon in order to maintain said segmental sections in their peripherally spaced relationship.

17. A rotary device comprising a rotor component having a plurality of radially extending bracket means; a ball bearing construction including a lower stationary supporting member having a raceway on the upper side thereof coaxial with the rotor component, an upper rotatable member comprising a plurality of peripherally spaced segmental sections each of which is associated with at least one bracket means of the rotor, said upper rotatable member having a raceway on the under side thereof adapted to register with the raceway in the stationary member, anti-friction bearing elements in said raceways for maintaining the members in axially spaced relation; and a plurality of arched plate springs resting with downwardly directed ends thereof on the rotatable bearing member and distributed in peripherally spaced relationship in such a way that each of the segmental sections of the rotatable member carries at least one of the arched plate springs, each of said arched plate springs being adapted to register at the apex thereof with one of the bracket means extending radially from the rotor component in order to sustain the weight of the rotor component by the plurality of the bracket means resiliently supported on the segmental sections of the rotatable bearing member; and means provided on the segmental sections of the rotatable bearing member to fix the position of the arched plate springs thereon; and in order to maintain said segmental sections in their peripherally spaced relationship.

18. A rotary device comprising a rotor component having a plurality of radially extending bracket means; a ball bearing construction including a lower stationary supporting member having a raceway on the upper side thereof coaxial with the rotor component, an upper rotatable member comprising a plurality of peripherally spaced segmental sections and having a raceway on the under side thereof adapted to register with the raceway in the stationary member, anti-friction bearing elements in said raceways for maintaining the members in axially spaced relation; a plurality of peripherally spaced arched plate springs resting with downwardly directed ends thereof on the rotatable bearing member, at least a number of said arched plate springs corresponding to the number of joints between the segmental sections of the rotatable bearing member bridging one joint each, each of said arched plate springs being adapted to register at the apex thereof with one of the bracket means extending radially from the rotor component in order to sustain the weight of the rotor component by the plurality of the bracket means resiliently supported on the segmental sections of the rotatable bearing member; and means provided on the segmental sections of the rotatable bearing member to fix the position of the arched plate springs thereon in order to maintain said segmental sections in their peripherally spaced relationship.

19. A rotary device as claimed in claim 18, in which each of said fixing means comprises a substantially U-shaped frame member attached to the segmental sections of the rotatable bearing member and framing each arched plate spring along one longitudinal side and both ends thereof, at least said frame members bridging the joints between the segmental sections of the rotatable bearing member including means to bring the arched plate spring framed thereby to register with the corresponding bracket means extending radially from the rotor component.

20. A rotary device as claimed in claim 19, in which the free ends of the frame members have inwardly directed projections facing the opposite longitudinal side of respective plate spring.

21. A rotary device as claimed in claim 19, in which the free ends of the frame members are bent upwardly.

22. A rotary device as claimed in claim 19, in which the longitudinal section of at least each of the frame members bridging the joints between the segmental sections of the rotatable bearing member is provided with guide projections registering with the corresponding bracket means extending from the rotor component.

23. A rotary device as claimed in claim 19, in which means for attachment of the frame members bridging the joints between the segmental sections of the rotatable bearing member include a dowel pin securing the leading end of each bridging frame member to the trailing end of the first segmental section seen in the direction of rotation of the pair of bridged segmental sections.

References Cited in the file of this patent

UNITED STATES PATENTS

| | | |
|---|---|---|
| 419,708 | Retzbach | Jan 21, 1890 |
| 2,230,989 | Barish | Feb. 11, 1941 |

FOREIGN PATENTS

| | | |
|---|---|---|
| 113,722 | Sweden | April 3, 1945 |